Jan. 27, 1959 C. C. BUCKELS 2,870,931
ELECTRICAL CONNECTION BOXES
Filed Jan. 28, 1953
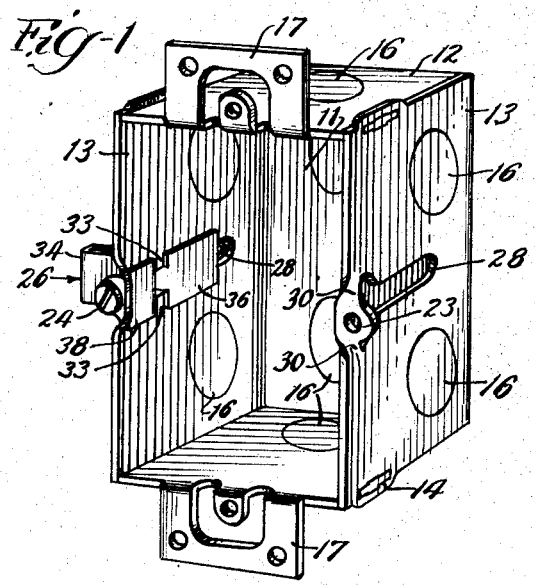
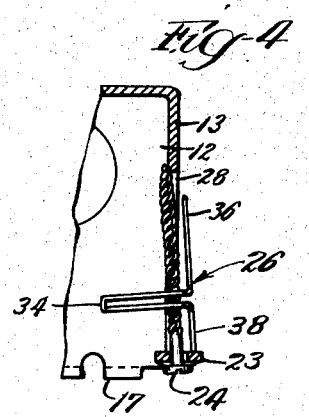
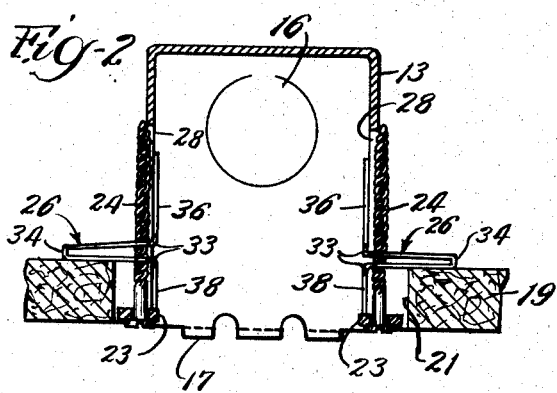
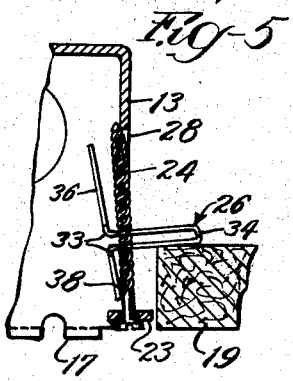
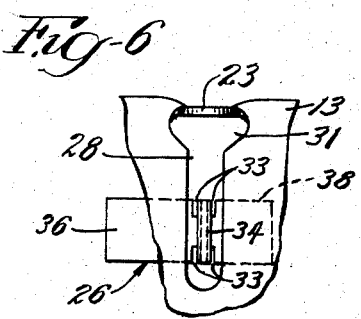
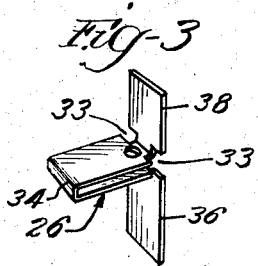
INVENTOR.
Christopher C. Buckels
BY
Louis Robertson Atty.

United States Patent Office 2,870,931
Patented Jan. 27, 1959

2,870,931

ELECTRICAL CONNECTION BOXES

Christopher C. Buckels, Chicago, Ill.

Application January 28, 1953, Serial No. 333,749

7 Claims. (Cl. 220—3.6)

Electrical connection boxes for electric wiring have now been used for many years. These are the boxes to which the pipes or other conduits run and which may be used for connection or for outlets. Thus the wires of a circuit may extend through one conduit or pipe to a box and there be connected to a lamp or a convenient outlet and perhaps also to wires running out through another conduit to other locations.

The present invention relates particularly to the mounting facilities for such boxes.

Electrical connection boxes have been supported in the same way for so long that improvements must have been elusive, unless no one had the vision even to see the need for improvement. The present invention provides a practical and dependable but inexpensive method of securing the box without screws going in the building member, which is especially suitable for use with material which will not readily hold screws, and is especially convenient for use in adding an outlet in an existing building.

This application is in part a continuation of Serial No. 53,541, filed October 8, 1948, and abandoned January 31, 1953, the disclosure of which is hereby incorporated by reference.

Additional objects and advantages of the invention will be apparent from the description and from the drawings.

*Designation of figures*

Figure 1 is a perspective view of one form of the box chosen for illustration of this invention, with certain brackets and clamps arranged for mounting it on plasterboard, that on one side being omitted.

Fig. 2 is a transverse horizontal sectional view showing the box of Fig. 1 mounted on plasterboard.

Fig. 3 is a perspective view of one of the slide clamps used in Figs. 1 and 2.

Fig. 4 is a fragmentary cross-sectional view showing the shipping position.

Fig. 5 is a fragmentary cross-sectional view showing the maximum swing of the slide legs away from the slide-slot.

Fig. 6 is a fragmentary view showing the insertion of a slide clamp in a slot.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

The form of box illustrated includes a back wall 11 from which is folded end wall 12 and side walls 13. Tongues 14 are formed integrally on the end wall 12, pass through slots in the side walls 13 and are bent over to hold the four sides firmly together. The usual knockouts or pryouts 16 will be provided in any desired arrangement. One feature of the present invention is that it does not interfere with the conventional arrangement illustrated.

The illustrated form of connection or outlet box is especially suitable for installation where it will be supported by plasterboard, lathe and plaster or the like, as is usually the case in installing additional outlets or switches in a finished structure. The usual end brackets 17 may be provided although they are preferably integral with the end walls 12 and folded outwardly therefrom. These rest on the outside of the supporting wall 19 through which a hole 21 has been cut.

*General description of novel features*

The present invention relates especially to novel means for holding the box in the wall with the bracket 17 bearing on the wall. According to the present invention the box is provided at its side with lugs or gates 23 through which screws 24 are passed, screwing into slide clamps 26. The slide clamps slide in slots 28 and are tightened against the wall 19 by the screws 24. The slide clamps 26 are so designed that after the box from which they have been removed is slipped through the opening 21, these clamps may easily be inserted through the slots 28 as seen in Fig. 6 and twisted until they are disposed generally as shown in Figs. 1 and 2.

*Further important features and details*

The gate 23 is preferably formed of metal from the sides 13, being formed when the slot 28 is punched. The slot 28 has an enlarged front portion 31 which at this stage surrounds the lower portion of the ring forming the main part of gate 23 and forms webs 30 by which the gate is connected to the rest of the box. Some manufacturers may prefer to leave the gate 23 in the plane of the walls 13. In that event they may leave the slot 28 closed by a pryout. The pryout would easily be removed and the gate 23 turned to the position illustrated, should the customer desire to install the box with slide clamps such as 26. However, the manufacturer now manufacturing these boxes has found it preferable to sell the boxes initially with the gates 23 as illustrated. Of course they could be turned back into the plane of walls 13 if they should be undesired for any use. This can be accomplished by pliers or by a strong rigid member such as a slim nail punch inserted through them.

Although the slide 26 could assume a rather simple L-shaped form, as illustrated in my co-pending application, the illustrated form is considerably preferred as in the copending application. It is provided with notches 33 for engaging the edges of slots 28, and has a clamp leg 34 and a rearwardly extending leg 36. The rearwardly extending leg 36 tends to close that part of the slot 28 which is not approximately closed by the wall. In the slide clamp now preferred, the clamp leg 34 is doubled back and extended into a forward leg 38. This construction has several advantages:

With just an L-shaped slide clamp, it is possible that after slipping the clamp leg through the slot 28, the rearward leg will accidentally be permitted to fall and the clamp lost in the wall.

The provision of forward and rearward legs 36 and 38 positively prevents this.

The doubling back of the clamp leg 34 provides a resilient action. The notches 33 are preferably just deep enough so that the clamp will fit smoothly in slot 28. The result is that the clamp will be flexed slightly in twisting it from the position shown in Fig. 6 to the position shown in Fig. 2. This necessity for flexing as it passes from one position to the other tends to lock it in the desired position, thereby facilitating the insertion of the screw.

Another advantage of the resiliency is that the two sides of the clamp leg 34 may be somewhat divergent from their common bend. Thus, after they are inserted, they will spring to the position seen in Fig. 2. Here the two portions of the slide clamp engage the edges of slot 28 at relatively widely spaced points. This provides a high stability for the clamp to resist the forces applied to it as it is tightened.

Should the slide clamp be tightened somewhat carelessly so that the screw 24 is permitted to swing inside of the box as seen in Fig. 5 and the two faces of clamp leg 34 brought close together, the leg 38 will bear on the wall 13 and the screw 24 to limit the twisting movement of the slide clamp so that it will continue to grip the wall 19 and also maintain the slot 28 approximately closed, the screw 24 aiding in this purpose.

The screw 24 is long enough so that when properly applied, its tip will lie outside of the box, resting against the bottom of slot 28 for greater stability in positioning the slide clamp.

For saving space during shipping and in the bin, the slide clamp 26 may be inserted from the outside to the position shown in Fig. 4. In this position it may be noted that the screw 24 may be turned to draw the leg 38 approximately against the gate 23, thus avoiding the untidy appearance which would result from having some of the boxes in the bin lying with screws apparently falling partly out. Also in this position, the customer sees that the legs 36 and 38 are capable of closing off the slot 28.

Although there have previously been proposals for securing such boxes in place by sliding clamps, none has been found satisfactory. All of such clamps prior to that of my co-pending application were subject to the fault of requiring a slot in the end wall 12. This precluded the provision of the end pryout 16, which is probably more often desired than any other one pryout. It will be observed that according to the present invention the slot 28 is in the side of the box whereby it may be positioned between the two side pryouts 16 without interfering with either or with the use of either aperture left when these pryouts are removed.

Ordinarily, the hole 21 will not be cut as wide as would appear from Fig. 2. Its width would be approximately the outside width of the box and deeper notches would be provided for the passage of screws 38. If the notches are not deep enough to receive the gates 23, a slight countersinking for these gates may be provided.

I claim:

1. A box for electric connections including oppositely positioned gates each comprising a ring formed from a side of the box and connected to the side integrally by narrow webs on opposite sides thereof extending away from the ring an appreciable length and twisted by turning the ring to lie in a plane perpendicular to said side, a slot in each of said sides extending away from said gate and being wider adjacent to the ring than the width of the ring to form said webs, a clamp extending through each slot, a screw passing through each ring and threaded to the associated clamp to draw it forward in the slot and a pair of opposed brackets each carried by a wall of the box to limit the movement thereof, said clamps each being slotted to guide the same along the slot and each having a leg extending along the slot and closing a part thereof.

2. A box for electrical connections including oppositely positioned gates each comprising a ring formed from a side of the box and connected to the side integrally by narrow webs on opposite sides thereof extending away from the ring an appreciable length and twisted by turning the ring to lie in a plane perpendicular to said side, brackets carried by the box for limiting the movement of the box into the wall and a slot in each of said sides extending away from said gate, being wider adjacent to the ring than the width of the ring to form said webs, being adapted to receive a slidable bracket therein and being of a length for accommodating movement of the bracket against the inside of a wall on which the box is mounted.

3. A box for electric connections including oppositely positioned lugs carried by the box at the front edge thereof, brackets secured to the box for limiting the movement of the box into a wall, a slot extending away from each lug, a screw extending through each lug and along each slot and a slide clamp in each slot and screwably engaged by each screw, each clamp comprising a single piece of sheet metal doubled back on itself to form a two-membered clamp leg and having each member bent at an angle divergently to form legs lying along the slot in opposite directions.

4. A box for electric connections including oppositely positioned lugs carried by the box at the front edge thereof, brackets secured to the box for limiting the movement of the box into a wall, a slot extending away from each lug, a screw extending through each lug and along each slot and a slide clamp in each slot and screwably engaged by each screw, each clamp comprising a single piece of sheet metal doubled back on itself to form a two-membered clamp leg, at least one of said members being bent at an angle to form a leg lying along the slot.

5. A box for electric connections including oppositely positioned lugs carried by the box at the front edge thereof, brackets secured to the box for limiting the movement of the box into a wall, a slot extending away from each lug, a screw extending through each lug and along each slot and a slide clamp in each slot and screwably engaged by each screw, each clamp comprising a single piece of sheet metal doubled back on itself to form a two-membered clamp leg, and both members having formations for slidably interengaging with said box structure.

6. A box for electric connections including oppositely positioned lugs carried by the box at the front edge thereof, brackets secured to the box for limiting the movement of the box into a wall, a slot extending away from each lug, a screw extending through each lug and along each slot and a slide clamp in each slot and screwably engaged by each screw, each clamp comprising a single piece of sheet metal doubled back on itself to form a two-membered clamp leg, and both members having notches just deep enough for slidably interengaging with said box structure, and said sheet metal having a set causing the members to tend to spring apart to prevent twisting of the clamp in the slot.

7. A connection box including a bottom, end walls and side walls, brackets on the end walls for engaging the outside of a room wall, pryouts in conventional positions, one on each end wall and two on each side wall, a slot in each side wall positioned between the two pryouts and extending forwardly and rearwardly, a slide clamp for each slot notched on opposite edges for sliding engagement with the edges of the slot, insertable through the slot from the inside of the box with the box in a completed room wall, and having a projection for engaging the rear face of the room wall, a lug at the front of the box approximately aligned with each slot and apertured for the passage of a screw rearwardly through the lug to threadedly engage the slide clamp in the slot, the aperture being at least partly in the plane of the side of the box.

References Cited in the file of this patent

UNITED STATES PATENTS

| | | |
|---|---|---|
| 916,436 | Greenfield | Mar. 30, 1909 |
| 1,208,393 | Smart | Dec. 12, 1916 |
| 1,957,003 | Selen | May 1, 1934 |
| 2,299,696 | Gregersen | Oct. 20, 1942 |
| 2,491,742 | Lein | Dec. 20, 1949 |
| 2,531,698 | Petrick | Nov. 28, 1950 |